United States Patent [19]

Koide et al.

[11] 4,031,669
[45] June 28, 1977

[54] AUTOMATIC PROFILING MACHINE

[75] Inventors: Sakae Koide, Tokyo; Shigeo Aoki, Habikino, both of Japan

[73] Assignee: Tahara-Shoyei Engineering Co., Ltd., Osaka, Japan

[22] Filed: Nov. 13, 1975

[21] Appl. No.: 631,550

[30] Foreign Application Priority Data

Nov. 19, 1974 Japan .......................... 49-133365

[52] U.S. Cl. .............................. 51/142; 51/101 R; 51/145 R; 51/147; 90/13.4

[51] Int. Cl.$^2$ ................. B24B 17/00; B24B 19/14; B24B 21/16

[58] Field of Search ............ 51/142, 144, 145, 147, 51/101 R, 101 LG; 90/13.4

[56] References Cited

UNITED STATES PATENTS

| | | | |
|---|---|---|---|
| 2,005,508 | 6/1935 | Shaw | 90/13.4 |
| 2,178,441 | 10/1939 | Swanson | 90/13.4 |
| 3,041,789 | 7/1962 | Cretin-Maitenaz | 51/101 R |
| 3,589,075 | 6/1971 | Carlson | 51/101 R |
| 3,750,345 | 8/1973 | Kolesar | 51/101 R |
| 3,786,600 | 1/1974 | Bloxsom | 51/101 LG |
| 3,834,084 | 9/1974 | Sakane | 51/101 R |

*Primary Examiner*—Al Lawrence Smith
*Assistant Examiner*—Nicholas P. Godici
*Attorney, Agent, or Firm*—Pollock, VandeSande & Priddy

[57] ABSTRACT

A model and a workpiece are rotated synchronously, and a stylus is disposed for relative movement toward or away from the model in a direction perpendicular to the axis of rotation thereof for contact therewith. The amount of displacement of the stylus from its neutral point which occurs while it contacts the model is detected by a tracer head and is divided into a pair of components lying in a plane perpendicular to the axis of rotation of the model which are along the direction of said relative movement and along a direction orthogonal thereto. The distance between the center of rotation of the model and the center of the stylus is also detected, and is utilized together with the two orthogonal components of the displacement, the radius of the stylus, a reference displacement of the stylus as well as an established speed therefor in order to control the speed of rotation of the model and the speed of said relative movement between the stylus and the model so that the speed with which the point of contact between the stylus and the model moves along the contour of the model becomes equal to a preselected value. A workpiece and a tool therefor are disposed in a similar relationship as the relationship between the model and the stylus, and are driven in synchronism with the model and the stylus for profiling the workpiece. Where the tool contacts the workpiece over a certain width as with an abrasive belt, the contact segment of the stylus is angularly moved so as to follow the curved surface of the model, thereby detecting an angle of skew of the curved surface so that the angle of skew of the tool coincides with the detected angle.

14 Claims, 18 Drawing Figures

FIG_1

FIG_2

FIG_3

FIG_6

AUTOMATIC PROFILING MACHINE

BACKGROUND OF THE INVENTION

The invention relates to an automatic profiling equipment in which a stylus is moved relative to a model to follow the contour thereof, and in which a tool and a workpiece is to be machined thereby are disposed for relative movement with respect to each other in a manner coincident with the relationship between the stylus and the model to thereby automatically machine the workpiece. More particularly, the invention relates to a control system for such equipment.

The surface machining of a workpiece such as turbine blade, propeller, screw or the like which has a complex configuration and includes a three dimensional twist has heretofore utilized a manual grinding or polishing operation subsequent to an electrolytic machining or copy milling of a forged workpiece. Either electrolytic machining or copy milling alone cannot provide a sufficient dimensional accuracy or surface finish, while manual grinding cannot readily achieve an increased stock removal. It will be appreciated that the machining of a turbine blade, for example, by urging it against a rotating grinding wheel of a running abrasive belt while holding it with the hand of an operator requires a high degree of skill and carefulness on the part of the operator, and also involves a problem of operational safety, resulting in a very heavy work, particularly when a large size blade is to be machined. The machining must proceed while repeatedly measuring the cross-sectional gauges at a number of locations in a careful manner, thus resulting in a substantially low working efficiency. In addition, it is difficult to maintain high accuracy, and it has been impossible to avoid a reduction in the accuracy between the gauges of adjacent parts.

A purely mechanical profile belt grinder using a cam is known, but requires a subtantially increased machining time. Its use is limited to a turbine blade for aircraft which is of a small size and which includes a reduced twist.

A number of profile milling machines are known which have used a stylus of small radius and in which the speed control has been based on the movement of the center of the stylus. However, as the radius of the stylus increases, a proper profiling operation is prevented for certain tools which produce an amount of cutting in proportion to the time length during which the tool is held in contact with the workpiece, since the conventional control of movement has been such that the speed with which the point of contact between the model and the stylus moves along the contour of the model does not remain constant, but varies. Where the workpiece is hard and has a degree of resilience, the dimensional accuracy and/or the surface finish has been poor. With a tool such as an abrasive belt which has a relatively large width, the degree of machining depends on the angle of contact between the tool and the workpiece, and proper machining cannot be achieved for a model which has a three dimensionally curved surface, unless the tool contacts the workpiece in conformity to the configuration of the curved surface. However, no such control has been achieved in conventional profiling machines. Furthermore, the conventional profiling machines incorporated a control over a pair of orthogonal coordinates such as X and Y directions.

It is an object of the invention to provide an automatic profiling control which assures a high machining accuracy even for an increased radius of the stylus.

It is another object of the invention to provide an automatic profiling control system which assures high machining accuracy for a tool such as an abrasive belt which has an increased width.

It is a further object of the invention to provide an automatic profiling control system capable of surface machining a workpiece such as a larged sized turbine blade of a configuration which includes a three dimensional twist.

It is an additional object of the invention to provide an automatic profiling control system which maintains high dimensional accuracy and achieves a satisfactory surface finish for a workpiece which is hard and has a degree of resilience.

It is still another object of the invention to provide an automatic profiling control system which provides control in polar coordinates rather than in orthogonal coordinates.

SUMMARY OF THE INVENTION

In accordance with the invention, a model and a workpiece are rotated synchronously, and a stylus is disposed for relative movement with respect to the model in a direction perpendicular to the axis of rotation thereof for contact therewith. The amount of displacement of the stylus from its neutral point while it contacts the model is detected by a so-called tracer head. The distance, R, between the center of rotation of the model and the center of the stylus is detected. The detected value of R is utilized together with the displacement for controlling the speed of rotation of the model as well as the speed of movement of the stylus relative thereto so that the speed with which the point of contact between the stylus and the model moves along the contour of the latter becomes equal to a given value. A workpiece and a tool which machines it are disposed in a positional relationship similar to that between the model and stylus, and are driven to move relative to each other in a manner similar to the relative movement between the model and the stylus. Since the speed with which the point of contact between the model and the stylus moves is controlled to assume a given value, a uniform machining is achieved for either convex or concave model surface, thus accomplishing a high machining accuracy. The contact segment of the stylus which is adapted to contact the model is constructed to be angularly movable so that it automatically tracks the curved surface of the model. In this manner, a skew of the contact segment of the stylus with respect to the model is detected, and the tool is disposed in a skewed position in a corresponding manner. This permits the use of a wide tool such as an abrasive belt for machining a twisted, three dimensional curved surface without increasing the machining time. The machining is performed in three dimensions, and accordingly both the stylus and the model are moved relative to each other along the axis of rotation of the latter, and the tool and the workpiece are similarly moved relative to each other in a corresponding manner, along the axis of rotation of the workpiece. The latter movement is also synchronized with the axial relative movement between the model and the stylus. The axial relative movement is slowed down where the model has an increased diameter, while it is accelerated where the model has a reduced diameter, thus achieving a uniform dwell time period in various regions.

BRIEF DESCRIPTION OF THE DRAWINGS

FIG. 12 is a block diagram of a Z-axis feed control system;

FIGS. 13A, B and C are diagrams illustrating a feed cycle of the tracer head and the abrasive belt, respectively;

DETAILED DESCRIPTION OF EMBODIMENTS

Before going into the detail of the invention, problems experienced with the control of a conventional profiling milling machine will be discussed. In the conventional profiling control system, the equation for establishing a profiling control speed has been derived by observing the movement of the center of the stylus. As a consequence, the tangential speed at the point of contact between the stylus and the model has not been constant except when profiling a rectilinear portion. In other words, the speed outputs $V_x$ and $V_y$ along the X and Y axes have been determined in accordance with the following equations:

$$V_x = V_0 \sin \theta \quad (1)$$

$$V_y = V_0 \cos \theta \quad (2)$$

thus without taking the radius of the stylus, $r$, into consideration. In these equations, $V_0$ represents the profiling speed at the center of the stylus and $\theta$ the angle which the vector $V_0$ forms with the Y axis.

Figure 1:
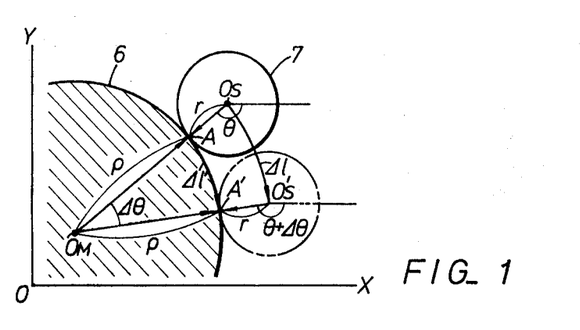
FIG. 1 is schematically illustrates the relationship between the speed of movement of the point of contact and the speed of the stylus.

However, in a general profiling operation, the radius of stylus $r$ is not negligible as compared with the radius of curvature, $\rho$, of the contour of the model. Specifically, referring to FIG. 1, a model 6 having the radius of curvature $\rho$ is contacted by a stylus 7 having a radius $r$, at point A. The manner of control is such that whenever the stylus does not contact the model, it is maintained in its neutral position, but is displaced by an amount $\epsilon$ in a direction normal to the contour of the model until it contacts the model, with the displacement $\epsilon$ being controlled so as to be equal to a reference value $\epsilon_0$. It is assumed that the displacement $\epsilon$ of the stylus or the reference value $\epsilon_0$ is sufficiently small as compared the radius $r$ of the stylus, and the angle formed between the normal to the contour of the model at the point of contact A and the X-axis is represented by $\theta$. It is also assumed that the stylus 7 moves to contact the model 6 at a point A' after a time interval $\Delta t$ while the center $O_s$ of the stylus moves to $O'_s$, and the angle of displacement changes from $\theta$ to $\theta + \Delta\theta$. Denoting the distance through which the point of contact has travelled by $\Delta l'$, and the distance through which the center of the stylus has travelled by $\Delta l$, the following equations apply:

$$\Delta l = (\rho + r) \Delta\theta \quad (3)$$

$$\Delta l' = \rho \Delta\theta \quad (4)$$

for $\epsilon_1 \, \epsilon_0 << r$.

Subtraction of the equation (4) from the equation (3) yields:

$$\Delta l - \Delta l' = r\Delta\theta \quad (5)$$

Dividing both sides by $\Delta t$, $$(\Delta l/\Delta t) - (\Delta l/\Delta t) = r(d\theta/dt) \quad (6)$$

Representing the speed with which the center of the stylus moves by V, and the speed of movement of the point of contact by $V_A$, $$V = \lim_{\Delta t \to 0} \frac{\Delta l}{\Delta t}, \, V_A = \lim_{\Delta t \to 0} \frac{\Delta l'}{\Delta t}.$$

Taking the limit of $\Delta t \to 0$ in equation (6), $$V - V_A = r(d\theta dt) \quad (7)$$

Elimination of $\Delta\theta$ from the equations (3) and (4) and taking the limit of $\Delta t \to 0$ yield:

$$V = (1 + (r/\rho)) V_A \quad (8)$$

As will be seen from equation (8), the difference between the speed of movement of the center of the stylus and the speed of movement of the point of contact increases, as the radius $r$ of the stylus increases, to an extent which is dependent on the ratio of $r$ to $\rho$, or to what degree the radius $r$: $\rho$ is negligible as compared with the radius of curvature, $\rho$, of the model. Thus, if the radius of curvature $\rho$ varies in various regions of the model, the speed $V_A$ of the point of contact does not remain constant, resulting in a non-uniform cutting depth. When copying a concave region of the model, it will be seen from the equation (8) that as $\rho$ approaches $r$, $V_A$ increases, ultimately causing an abnormality in the profiling operation. This results from the fact that the speed of the point of contact does not remain constant in order to permit a profiling operation with a uniform speed at the center of the stylus, as will be understood by reference to the equations (1) and (2). It will be thus seen that the desired control can be achieved by controlling the speed $V_A$ of movement of the point of contact with the model to a constant value, rather than controlling the speed V of the center of the stylus to a constant value. To this end, representing the desired constant speed by $V_0$, and substituting $V_A = V_0$ into the equation (7), the center of the stylus may be driven with a speed V which is expressed as follows:

$$V = V_0 + r(d\theta/dt) \quad (9)$$

By providing such a control, V is made independent of ρ. While the detection of ρ is relatively difficult, it is a simple matter to detect $\Delta\theta$, whereby a control signal can be easily derived.

Figure 2:
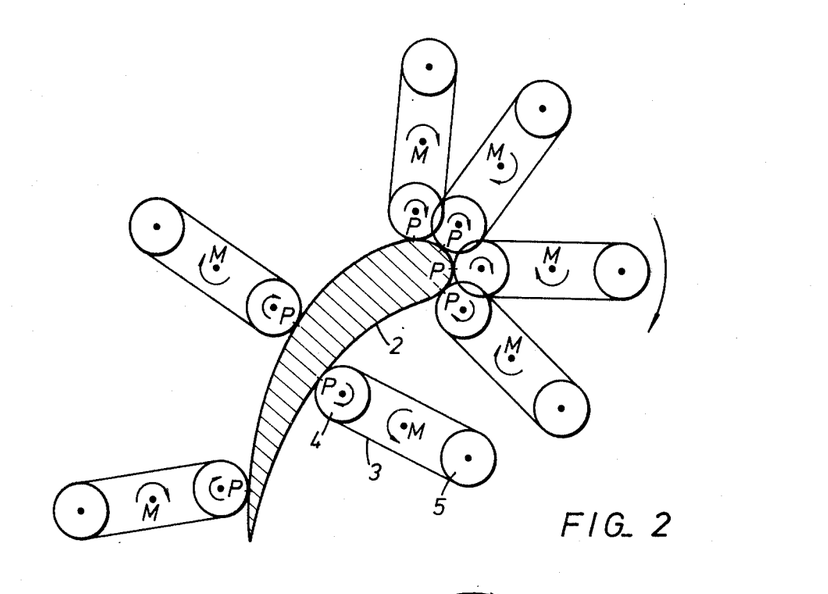
FIG. 2 illustrates the relationship between an abrasive belt and a workpiece in a conventional profiling machine.

In a belt grinder, an abrasive belt 3 extends around a pair of wheels comprising a contact wheel 4 and a drive wheel 5, and the abrasive belt 3 is brought into contact with a workpiece 2 to machine it as it runs around the contact wheel 4 while rotating across the pair of wheels, as illustrated in FIG. 2. If it is desired to perform such a belt grinding operation by controlling the rectilinear motion of the grinder along the two axes in the similar manner as in the conventional profiling milling machine, a line PM joining a point of contact, P, with the workpiece and the middle point M of the abrasive belt 3 intermediate the wheels 4, 5 must be maintained normal to the workpiece at the point P, or more exactly, at the point of contact between the stylus and the belt. This requires the provision of a mechanism which permits a rotation of the abrasive belt 3 about the point M, a control system for controlling such rotation, and means for accurately detecting the normal direction for assuring a reliable control. In order to grind the entire periphery of the workpiece, the whole grinding head assembly including the wheels 4, 5 and the belt 3 must be turned around the workpiece 2 as shown in FIG. 2, requiring a very complex mechanical control arrangement, which would be prohibitive.

Figure 3:
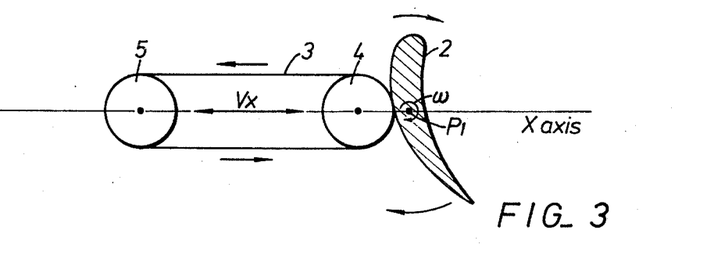
FIG. 3 illustrates the relationship between the abrasive belt and the workpiece in a belt grinder to which the invention is applied.
Figure 4:
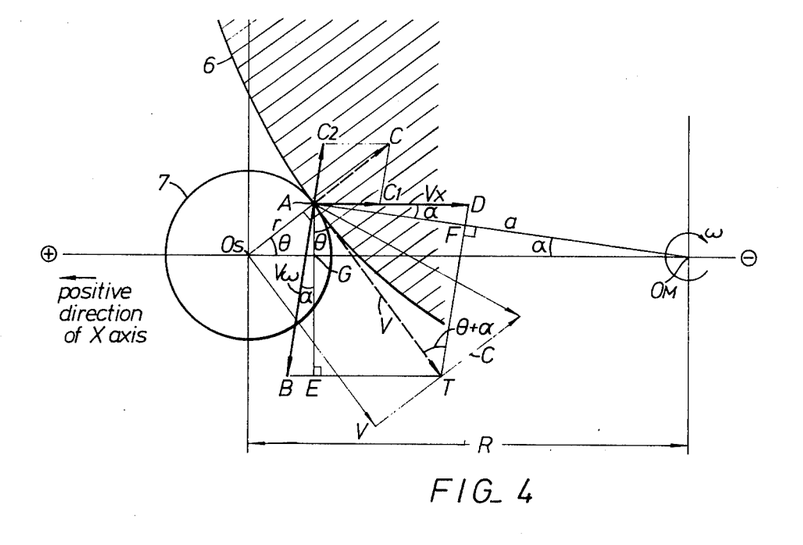
FIG. 4 is a vector diagram which illustrates the derivation of an equation which establishes the speed in the control system according to the invention.

Referring to FIG. 3, in accordance with the invention, the grinding head assembly is moved with a speed $V_x$ in the X axis direction which passes through the center of the contact wheel 4 while the workpiece 2 is rotated with an angular velocity ω about a point $P_1$ which is located on the X axis and within the profile thereof. The speed Vx and the angular velocity ω are controlled so that the point of contact between the contact wheel 5 and the contour of the workpiece 2 moves along the contour with a uniform speed.

lishes a speed in accordance with such control will be described below with reference to FIG. 4. The FIG. is a cross section illustrating the contact between the model 6 and the stylus 7. The model 6 is rotated clockwise with an angular velocity ω about a stationary axis $0_M$ (axis A) which is one the X axis and is perpendicular to the plane of the section shown. The stylus 7 is in the form of a cylinder having a radius of r, with its center $0_S$ located on the X axis, and is driven along the X axis for relative movement with respect to the model 6 with the speed $V_x$, the movement to the right, as viewed in this Figure, being taken as the positive direction. Assuming that the stylus 7 contacts the model 6 at a point A, the angle which the radius $\overline{O_SA}$ forms with the positive direction of the X axis is represented by θ as measured in the counter-clockwise direction, and the angle which the line segment $\overline{O_MA}$ forms with the negative direction of the X axis is represented by α as measured in the clockwise direction. In order for the point of contact, A, on the model 6 to move with a uniform speed $V_0$, it is only necessary that the center $O_S$ of the stylus 7 be moved in the tangential direction with the speed V which is given by the equation (9). Since the movement of the point $O_S$ is limited to take place along the X axis, the velocity vector V ($\overline{AT}$) is decomposed into a component $V_x$ parallel to the X axis at the point A, and a component $V_\omega$ which is perpendicular to the line segment $\overline{O_MA}$. It will be seen that $V_x$ represents the speed of movement of the point $O_S$ while $V_\omega$ represents a component which results from a clockwise rotation of the model 6 with an angular velocity ω. Denoting the distance $\overline{O_SO_M}$ by R, the geometrical relationship shown in FIG. 4 gives the following relationships $$V_x = \overline{AD}\frac{\overline{AF}}{\cos\alpha} = \frac{\overline{AT}\sin(\theta+\alpha)}{\cos\alpha}$$
$$= V(\sin\theta + \cos\theta \cdot \tan\alpha) \quad (10)$$

$$V_\omega = \overline{AB} = \frac{\overline{AE}}{\cos\alpha} = \frac{\overline{AT}\cos\theta}{\cos\alpha} = V\frac{\cos\theta}{\cos\alpha} \quad (11)$$

$$\omega = \frac{V_\omega}{\overline{O_MA}} = \frac{V_\omega}{a} \quad (12)$$

$$\cos\alpha = \frac{\overline{O_MG}}{\overline{O_MA}} = \frac{\overline{O_MO_S} - \overline{O_SG}}{\overline{O_MA}}$$
$$= \frac{R - r\cos\theta}{a} \quad (13)$$

$$\tan\alpha = \frac{\overline{GA}}{\overline{O_MG}} = \frac{r\sin\theta}{R - r\cos\theta} \quad (14)$$

Substitution of the equation (14) into the equation (10) yields:

$$V_x = V\left(\sin\theta + \frac{\cos\theta \cdot r\sin\theta}{R - r\cos\theta}\right)$$
$$= \frac{R}{R - r\cos\theta}V\sin\theta \quad (15)$$

Substitution of the equations (11) and (13) into the equation (12) yields:

$$\omega = \frac{1}{a}V\cos\theta\frac{a}{R - r\cos\theta} = \frac{1}{R - r\cos\theta}V\cos\theta \quad (16)$$

In order to maintain the displacement ε of the stylus at a constant value $\epsilon_0$, a correction velocity C is applied which is always directed inward from $O_S$ and has a magnitude represented by the following equation:

$$C = K(\epsilon - \epsilon_0)V \quad (17)$$

As with the equations (10) and (11), the X axis component of C is represented by $C_1$ and its component perpendicular to $\overline{O_MA}$ by $C_2$, both of which are represented as follows:

$$C_1 = C\frac{\cos(\theta + \alpha)}{\cos\alpha} \quad (18)$$

-continued $$C_2 = -C \frac{\sin \theta}{\cos \alpha} \quad (19)$$

Combining the equations (12), (13) and (14) together:

$$C_1 = \frac{R}{R - r \cos \theta} \cdot C \left( \cos \theta - \frac{r}{R} \right) \quad (20)$$

$$\omega_0 = -\frac{R}{R - r \cos \theta} \cdot \frac{C \sin \theta}{R} \quad (21)$$

By substituting the equation (17) into the equation (20) and then adding the equations (20) and (15) together, the corrected speed $V_x$ along the X axis is represented as follows:

$$V_x = \frac{R}{R - r \cos \theta} V \left\{ \sin \theta + K (\epsilon - \epsilon_0) \left( \cos \theta - \frac{r}{R} \right) \right\} \quad (22)$$

Substitution of the equation (17) into the equation (21) and addition of the latter with the equation (16) gives the corrected angular velocity $\omega$ which is expressed as follows:

$$\omega = \frac{R}{R - r \cos \theta} \cdot \frac{V}{R} \left\{ \cos \theta - K(\epsilon - \epsilon_0) \sin \theta \right\} \quad (23)$$

Substitution of the equation (9) into the equations (22) and (23) yields:

$$V_x = \frac{R}{R - r \cos \theta} \left( V_0 + r \frac{d\theta}{dt} \right) \left( \sin \theta + K(\epsilon - \epsilon_0) \left( \cos \theta - \frac{r}{R} \right) \right) \quad (24)$$

$$\omega = \frac{V_0 + r \frac{d\theta}{dt}}{R - r \cos \theta} \left\{ \cos \theta - K(\epsilon - \epsilon_0) \sin \theta \right\} \quad (25)$$

By normally detecting the variables R, $\sin \theta$, $\cos \theta$, $d\theta/dt$ and $\epsilon$ and using the constants $r$, $\epsilon_0$, $V_0$ and K, calculations are performed in accordance with the equations (24) and (25) to derive $V_x$ and $\omega$ in order to control the velocity of the stylus according to the value of $V_x$ and to control the rotational speed of the model according to the value of $\omega$ so that a profiling along the contour of the model can be achieved with a uniform peripheral speed.

Figure 5:
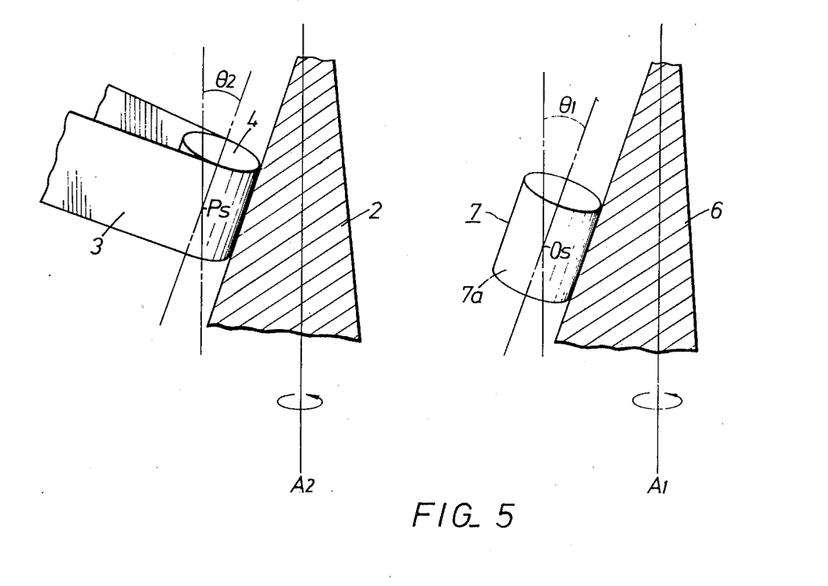
FIG. 5 illustrates the maximum contact between the stylus and the model, and between the abrasive belt and the workpiece, respectively.

When a three dimensionally twisted surface of a workpiece such as turbine blade is machined by a wide tool such as an abrasive belt, a control must be maintained such that the entire effective surface of the tool engages the surface to be machined. If only a portion of the effective surface of the tool, which is the edge portion in most cases, engages the workpiece, a non-uniformity of machining will result. To avoid this, the cylindrical contact segment 7a of the stylus 7 is made angularly movable about the point $O_S$ in a plane which includes the X axis (shown in FIG. 6) and the axis of rotation $A_1$ of the model 6, as illustrated in FIG. 5. The contact segment 7a of the stylus will have its maximum contact with the surface of the model 6 at the point of contact therebetween, and an angle of skew $\theta_1$ which the contact segment 7a then assumes with respect to the axis of rotation $A_1$ of the model is detected. The workpiece 2 and the contact wheel 4 are disposed in the same relative relationship as that between the model 6 and the contact segment 7a. To this end, an angle of skew $\theta_2$ of the contact wheel (the entire grinding head assembly) with respect to the axis of rotation $A_2$ of the workpiece 2 is also detected, and the skew of the wheel 4 is controlled in a tracking manner so that $\theta_2 = \theta_1$. The axis of rotation of the contact segment 7a or the grinding head assembly 3 which angularly moves around the respective center $O_S$ or $P_s$ will be referred to hereinafter as an axis B. Such a control achieves a most effective grinding of the surface of the workpiece by the surface of the abrasive belt 3.

For a conventional turbine blade which has a substantial longitudinal length, the relative position of either stylus or the model must be longitudinally shifted in a sequential manner in order to permit the stylus to contact the whole surface of the model. This is achieved by moving the stylus along the axis A or in a direction parallel to the axis of rotation of the model, and this direction of movement will be referred to hereinafter as the Z axis. The tool is similarly moved relative to the workpiece in the direction of the Z axis.

Figure 6:
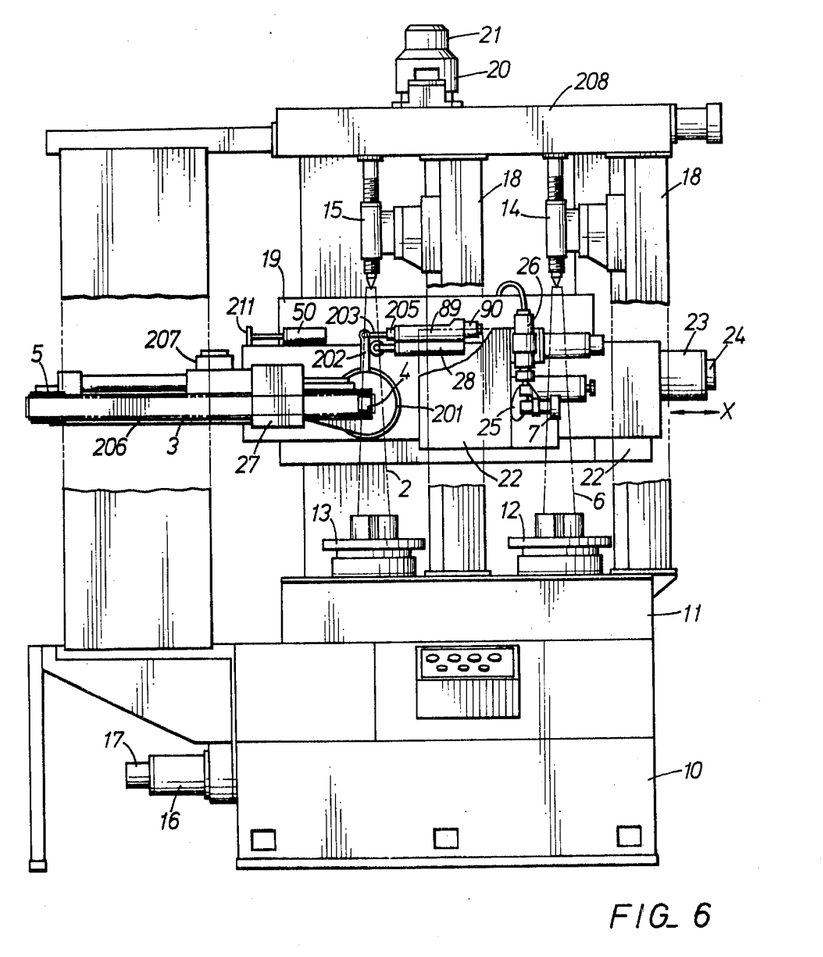
FIG. 6 is a front view of one embodiment of the automatic profile grinder to which the invention is applied.

Referring to FIG. 6, a belt grinder to which the above mentioned profiling control system is applied will be described. FIG. 6 is a front view of a belt grinder including a crossbar 208 which is secured to the upper ends of a plurality of stanchions 18 which are fixedly mounted on a base 10. A pair of turntables 12, 13 are mounted on a mount 11 which is secured to the base 10, and the model 6 is mounted on the turntable 12. The top end of the model 6 is engaged and supported by a centering shaft 14. In a similar manner, the workpiece 2 is mounted on the turntable 13 and its top end is engaged and supported by another centering shaft 15. The two centering shafts 14, 15 are mounted on the crossbar 208. The rotary shafts (referred to as A shafts) for the turntables 12, 13 extend downwardly and each carries a bevel gear at its respective end within the base 10. An A shaft servomotor 16 is mounted on the lateral wall of the base 10 and has its rotary shaft extending horizontally into the base 10, and a bevel gear is carried by the end of this rotary shaft for meshing engagement with the bevel gears mounted on the rotary shafts associated with the turntables 12, 13, whereby these turntables are rotated in synchronism with each other. The synchronous rotation can also be accomplished by electrical means. It will be noted that the motor 16 is associated with a tachometer 17.

A Z shaft 19 is mounted on the stanchions 18 by a ball and screw joint, and is moved vertically (along the Z axis) by a Z axis servomotor 20 which is secured to the crossbar 208. The motor 20 is also associated with a tachometer 21. An X axis slide 22 is mounted on the Z axis slide 19 by a ball and screw joint so as to be movable in the horizontal direction (along the X axis), such movement being enabled by an X axis servomotor 23 mounted on the Z axis slide 19. The motor 23 is also associated with a tachometer 24.

A tracer head 26 is attached to the X axis slide 22 and includes the stylus 7 for contact with the model 6. Specifically, the contact segment of the stylus is adapted to be skewed in conformity to the surface of the model 6 which it contacts, and the angle of skew is detected by a skew angle detector 25. The tracer head 26 also detects a displacement $\epsilon$ of the stylus 7 in the X-Y plane (in the horizontal plane as viewed in this Figure). The abrasive belt 3 is disposed for movement in tracking relationship with a movement of the stylus 7. Specifically, an oscillating body 201 is rotatably mounted on the X axis slide 22, and includes an extension in the form of an arm 202 which is pivotally connected with another arm 203. A rotation of a motor 89 is translated into a translational movement in a translating device 205, and the arm 203 is fixed to the output shaft which provides the translational movement. As a result, the oscillating body 201 moves angularly as the motor 89 rotates. One end of a head assembly 206 is secured to the oscillating body 201, and the wheels 4, 5 are rotatively mounted on the opposite ends of the head assembly 206, with the abrasive belt 3 running around the pair of wheels 4, 5. A motor 207 mounted on the assembly 206 drives the wheel 5 for rotation. Under the control of the motor 89, the wheel 4 is maintained at the same angle of skew as assumed by the contact segment of the stylus 7. Since the belt 3 and the stylus 7 are mounted on the X axis slide 22, the contact region of the belt 3 with the workpiece 2 follows the same movement as the contact segment of the stylus 7 relative to the model 6. The oscillating mechanism for the belt 3 is referred to as a B axis oscillating mechanism 27. An automatic control is accomplished by driving the motor 89 so as to achieve the relationship $\theta_1 = \theta_2$ in accordance with a difference signal between a first electrical signal corresponding to the angle of inclination $\theta_2$ of the belt 3 which is detected by a differential transformer 28 having its movable core held in abutment against the arm 202 of the oscillating body 201, and a second electrical signal from a differential transformer provided in the skew angle detector 25.

The turntable 12 on which the model 6 is mounted and the turntable 13 on which the workpiece 2 is mounted are synchronously rotated in the same direction of rotation. The stylus 7 is urged against the model 6, and the abrasive belt 3 is urged against the workpiece 2 in the same direction along the X axis for lineal contact. The B axis oscillating mechanism 27 is automatically controlled by the electrical signal indicative of the skew angle $\theta_1$ of the stylus 7 and the electrical signal from the differential transformer 28 which represents the angle $\theta_2$ so that the skew which the abrasive belt 3 assumes relative to the workpiece 2 is maintained at the same value as the skew assumed by the stylus 7 relative to the model 6. As mentioned previously, in order to provide a control such that the point of contact between the stylus and the model obtains a uniform speed, it is necessary to detect the distance R between the center of rotation of the model 6 and the center of the stylus 7. To this end, a differential transformer 50 is mounted on the Z axis slide 19 and includes a movable core, the free end of which is brought into abutment against a projection 211 on the X axis slide 22, in alignment with the X axis. As the respective A shafts of the turntables 12, 13 rotate, the stylus 7 and the abrasive belt 3 move horizontally together with the X axis slide 22 in conformity to the configuration of the model, whereby the stylus 7 follows the surface of the model and the abrasive belt 3 moves in synchronism with the stylus 7 to grind the workpiece 2 while being moved upwardly or downwardly by the Z axis slide 19.

Figure 7:
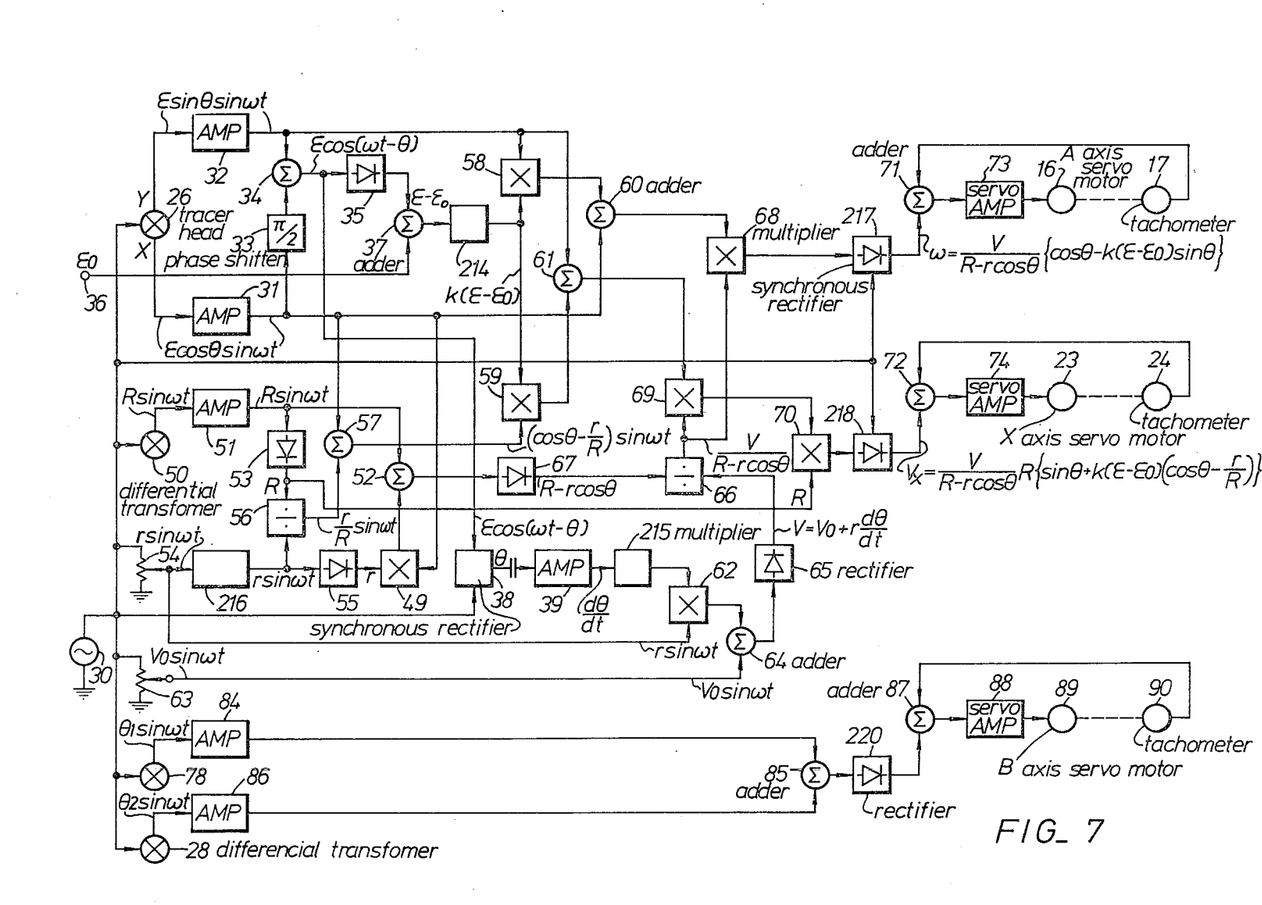
FIG. 7 is a block diagram of an arrangement for obtaining various control signals in the automatic profiling control system according to the invention.

Referring to FIG. 7, an arrangement for obtaining the control signals given by the equations (24) and (25) for the belt grinder shown in FIG. 6 will be described. A reference frequency oscillator 30 produces a sinusoidal signal $E\sin \omega t$, which is supplied to the tracer head 26, and the differential transformers contained therein for detecting the respective displacement along the X axis and along the Y axis which is orthogonal to both the X axis and A shafts produce $\epsilon \cos \theta \sin \omega t$ and $\theta \sin \omega t$ in response to the displacements along the X and Y axes, respectively. These signals are amplified by amplifiers 31, 32, and the signal representing $\epsilon \cos \theta \sin \omega t$ will be shifted by $\pi/2$ by a phase shifter 33, thus providing $\epsilon \cos \theta \cos \omega t$. This is added with $\epsilon \sin \theta \sin \omega t$ in an adder 34 to produce $\epsilon \cos(\omega t - \theta)$. The sum output is rectified by a full wave rectifier 35 to provide a rectified output, from which a d.c. voltage corresponding to $\epsilon_0$ (reference deviation) which is applied to a terminal 36 is subtracted in a circuit 37, thus producing a d.c. signal $\epsilon - \epsilon_0$. This d.c. signal is multiplied by a factor of K in a circuit 214 which comprises either an attenuator or an amplifier to produce $K(\epsilon - \epsilon_0)$.

Figure 8:
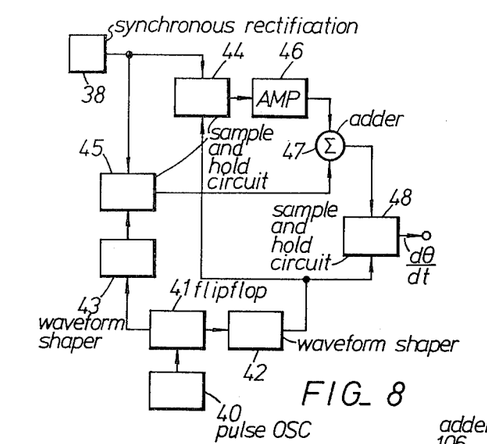
FIG. 8 is a block diagram showing one example of a differentiator circuit.

The signal $\epsilon \cos(\omega t - \theta)$ from the adder 34 is compressed in amplitude in a circuit 38 and is subjected to a synchronous rectification, producing a d.c. voltage corresponding to $\theta$ (phase angle). This output is passed through a CR-type differentiator 39 to provide $d\theta/dt$. It should be understood that the differentiation can be achieved by a means such as a sample-and-hold differentiator. By way of example, FIG. 8 shows that an output from a pulse oscillator 40 is applied to a flipflop 41, the output of which is formed by a pair of waveform shapers 42, 43 into a pair of gate pulses displaced from each other by one-half the period. These gate pulses are utilized to sample the d.c. output $\theta$ from the circuit 38, the sampled values being held in a pair of sample-and-hold circuits 44, 45. One of the outputs from these circuits is phase inverted by an amplifier 46 and is then added with the other output in a circuit 47, and the resulting sum is detected by a sample-and-hold circuit 48, thus producing $d\theta/dt$.

Returning to FIG. 7, the signal $E\sin \omega t$ from the oscillator 30 is supplied to a differential transformer 50 which detects the distance R between the center of rotation, $O_M$ of the model 6 and the center $O_S$ of the stylus (see FIG. 4), thus producing $R\sin \omega t$. This output is passed through an amplifier 51 to be fed to an adder 52 and a rectifier 53. On the other hand, the output from the oscillator 30 is passed through a variable resistor 54 to provide a signal $r\sin \omega t$ which varies in accordance with the radius r of the stylus, this output being multiplied by a factor of $k_1$ in a circuit 216 before being fed to a rectifier 55 and a divider 56. It is assumed here that $k_1 = 1$. The output r from the rectifier 55 and $\epsilon \cos \theta \sin \omega t$ from the amplifier 31 is multiplied together in a circuit 49, and the multiplied output $\epsilon r\cos \theta \sin \omega t$ is fed to an adder 52. The divider 56 produces an a.c. signal which corresponds to $r/R$, which is applied to a circuit 57 for subtraction from an a.c. signal from the amplifier 31 which corresponds to $\cos \theta$, thus producing an a.c. signal corresponding to $\epsilon \cos \theta - r/R$. This signal is multiplied by $K(\epsilon - \epsilon_0)$ from the circuit 37 in a circuit 59. The factor $K(\epsilon - \epsilon_0)$ is also used in a circuit 58 for multiplication with $\epsilon \sin \theta \sin \omega t$ from the amplifier 32.

Thus signals $\epsilon \cos \theta \sin \omega t$ and $\epsilon \sin \theta \sin \omega t$ are derived from the stylus 7, and vary with a displacement $\epsilon$ from the neutral position of the stylus 7 in the X-Y plane. However, because of the servo system which maintains $\epsilon$ at a value close to the reference deviation $\epsilon_0$, it can be considered that these signals are a.c. voltage signals having amplitudes which are represented by $\cos \theta \sin \theta$, respectively. In this manner, the outputs of the multipliers 58, 59, are a.c. voltage signals corresponding to $K(\epsilon - \epsilon_0)\sin O$ and $K(\epsilon - \epsilon_0)(\cos \theta - r/R)$. These signals are applied to adders 60, 61 for addition with a.c. signals corresponding to $\cos \theta$ and $\sin \theta$, respectively, which are supplied from the amplifiers 31, 32.

The output $d\theta/dt$ from the circuit 39 is multiplied by a factor of $k_2$ in a circuit 215 and then fed to a multiplier 62 for multiplication with $r\sin \omega t$ from the variable resistor 54. Assuming that $k_2 = 1$, a signal $V_0 \sin \omega t$ indicative of the uniform speed $V_0$ at the point of contact of the stylus moving along the model 6 is derived from a variable resistor 63, and is supplied to an adder circuit 64 together with the output from the multiplier 62, thereby producing an a.c. signal corresponding to $V = V_0 + r(d\theta/dt)$. This signal is rectified by a circuit 65 before being fed to a divider 66, which is also fed with an rectified a.c. signal corresponding to $R - r\cos \theta$ from the circuit 52 through a rectifier 67. Thus the divider circuit 66 produces a d.c. voltage corresponding to $V/(R + r\cos \theta)$, which is applied to multipliers 68, 69 for multiplication with the outputs of the adders 60, 61, respectively. The multiplier output of the circuit 68 is synchronously rectified by a circuit 217 to provide the control signal $\omega$ as given by the equation (25). The output of the circuit 69 and the output R from the circuit 53 are multiplied together in a circuit 70, the output of which is synchronously rectified by a circuit 218 to provide the other control signal $V_x$ as given by the equation (24).

These control signals $\omega$ and $V_x$ are passed through adders 71, 72 and through servo amplifiers 73, 74, respectively to be supplied to the A shaft servo motor 16 (FIG. 6) and the X axis servo motor 23 (FIG. 6), respectively. These motors 16, 23 drive the turntables 12, 13 for rotation, whereby the stylus 7 and the abrasive belt 3 move along the X axis. The output of the tachometers 17, 24 are negatively fed back to the adders 71, 72, respectively. In this manner, the movement of the stylus along the X axis and the rotational movement of the model 6 are controlled so that the stylus 7 moves around the model 6 with a uniform speed of movement at its point of contact with the model 6. The abrasive belt 3 and the workpiece 2 move relative to each other in the corresponding manner, thus profiling the workpiece.

Figures 9, 10:
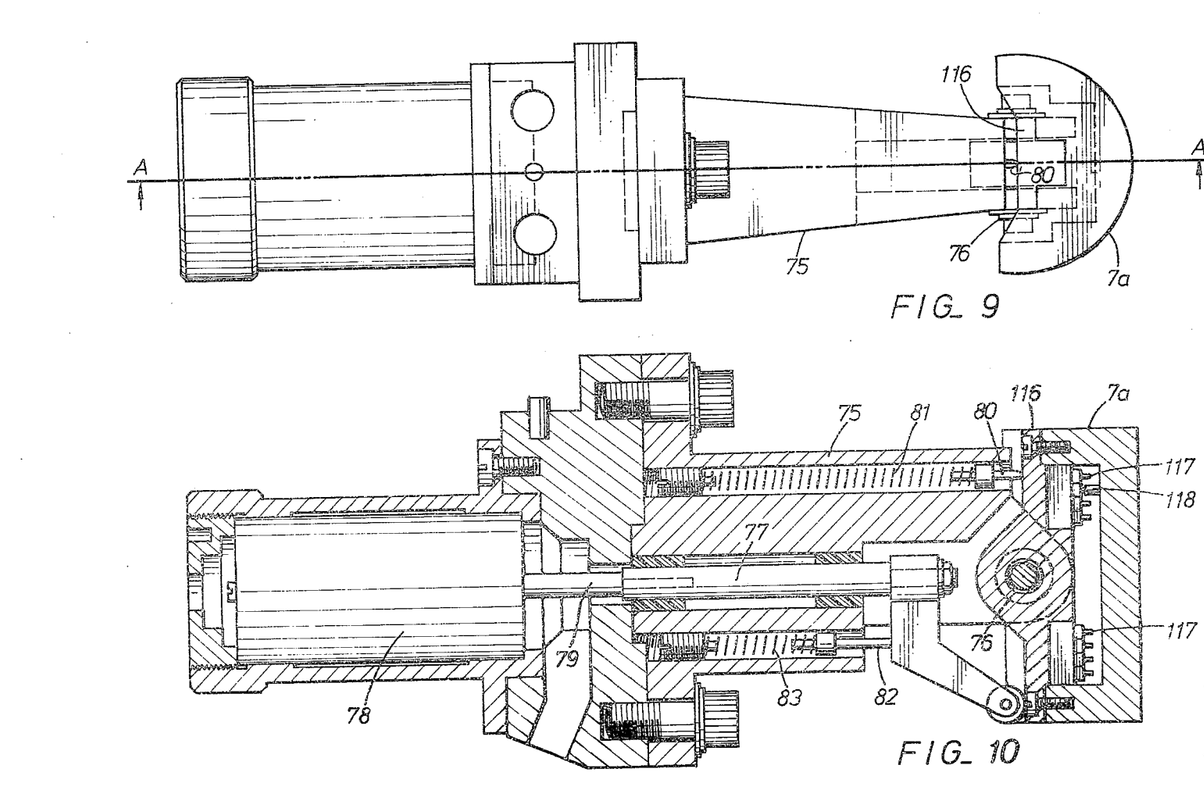
FIG. 9 is a top plan view of one example of a skew angle detector in combination with the contact segment of the stylus.
FIG. 10 is a cross section taken along the line A—A of FIG. 9.

As discussed above, it is desirable that the workpiece 2 be ground by the whole width of the abrasive belt 3. To this end, the crosswise skew of the abrasive belt is controlled in accordance with the skew assumed by the surface of the model. In the present embodiment, this is achieved in the following manner: Referring back to FIG. 5, as the model 6 is engaged by the stylus 7, the skew angle of the contact segment 7a of the stylus 7 is detected by the skew angle detector 25 (see FIG. 6), and the abrasive belt 3 is driven by the B shaft servo motor 89 in a manner to track the detected angle. The skew angle detector 25 may be constructed as illustrated in FIGS. 9 and 10, for example, in which it will be noted that in the region of the tracer head 26 where the stylus is mounted, there is provided an arm 75 which extends along the X axis. The central portion of the contact segment 7a of the stylus 7 is pivotally mounted on the free end of the arm 75 so as to be rotatable about a pin 76. The contact segment 7a is semi-cylindrical in configuration, and is attached to the arm 75 so as to be rotatable about the pin 76 which extends along a diameter thereof in a direction parallel to the Y axis.

The skew angle $\theta_1$ of the contact segment 7a is transmitted as a displacement to a core 79 of a differential transformer 78 located within the arm 75 through a core connecting rod 77 which is pivotally connected with the lower end of the contact segment 7a. A pin 80 is resiliently urged by a spring 81, received within the arm 75, against the rear surface of the contact segment 7a, or the surface which is opposite to the surface adapted to engage the model 6, in the upper region of the contact segment 7a. A pin 82 is resiliently urged by a spring 83, received within the arm 75, to bear against the core connecting rod 77 adjacent the contact segment 7a, whereby the contact segment 7a of the stylus is normally biased to its original position so that the axis of the contact segment 7a is maintained parallel to the A shaft (the axis of rotation of the model) whenever it is moved away from the model.

Figure 11:
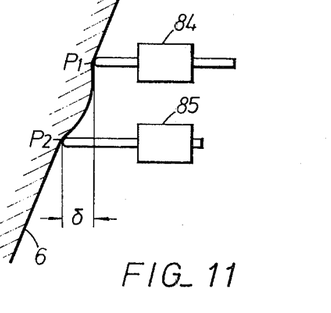
FIG. 11 schematically illustrates a conventional manner of detecting a skew angle.

In the conventional arrangement for detecting skew angle, a pair of differential transformers 84, 85 are fixedly mounted so as to be spaced in a direction parallel to the Z axis, thereby providing a differential voltage output, as illustrated in FIG. 11. With this arrangement, an accurate detection of the skew angle cannot be achieved when there is a change in the curvature of the surface of the model 6 in its area located between a pair of points $P_1$, $P_2$ of contact between the transformers 84, 85 and the model 6. However, the skew angle detector 25 shown in FIGS. 9 and 10 provides a continuous and smooth detection of a signal which varies with the curvature of the surface of the model 6.

As described in connection with FIG. 6, the abrasive belt 3 extends around the contact wheel 4 which is located nearer the workpiece 2, and also around the wheel 5 which is spaced therefrom in a direction parallel to the X axis. The B shaft oscillating mechanism 27 is constructed such that the abrasive belt 3 will be positioned for grinding the workpiece 2, or more correctly, be rotatable along an arcuate path in the X, A plane about the center of the contact wheel 4. A skew angle $\theta_2$ which the abrasive belt 3 assumes crosswise with respect to the A shaft is detected as an electrical signal by the feedback differential transformer 28, which however may be replaced by another type of transducer. A servo function is provided so as to maintain $\theta_1 - \theta_2 = 0$. Specifically, as illustrated in FIG. 7, the signal $\theta_1 \sin \omega t$ which is detected by the differential transformer 78 located within the skew angle detector 25 is passed through an amplifier 84 to be fed to an adder 85, which is also fed with the signal $-\theta_2 \sin \omega t$ detected by the differential transformer 28, through an amplifier 86, and thus produces an output $(\theta_1 - \theta_2) \sin \omega t$. This output is rectified by a rectifier 220, and then fed through an adder 87 and an amplifier 88 to drive a servo motor 89 which controls the B shaft oscillating mechanism 27, thus rotating the grinding head assembly 206. The output of a tachometer 90 which is driven by the motor 89 is negatively fed back to the adder 87. In this manner, the skew angle $\theta_2$ of the belt 3 is maintained in coincidence with the skew angle $\theta_1$ of the contact segment 7a. As a result, if a complex skew or change in the curvature is contained in the configuration of the model 6, the abrasive belt 3 is maintained in abutment against the workpiece 2 over the full width thereof just in the same manner as machining a flat surface, thus preventing an offset abutment and enabling a grinding operation to be completed with high accuracy and within a short period of time.

In the course of the machining, the stylus 7 and the abrasive belt 3 are fed in the direction of the Z axis. When continuously profiling a workpiece such as a turbine blade which has substantially different sizes in its root and tip end portions, a uniform feed rate along the Z axis will result in differential pitches as between the root and the tip end portions. In the region of the thicker root portion, it takes a longer time for the stylus to complete one round around the periphery of the model, so that the pitch will be increased, whereas the time for such one round will be reduced in the region of the tip end portion, thus reducing the pitch. In order to achieve as uniform a pitch as possible, an arrangement is provided in the present embodiment in which the time required for one revolution of the model is determined and converted into an electrical signal, which is used to control the feed rate along the Z axis during the next one revolution.

Figures 12, 13A, 13B, 13C:
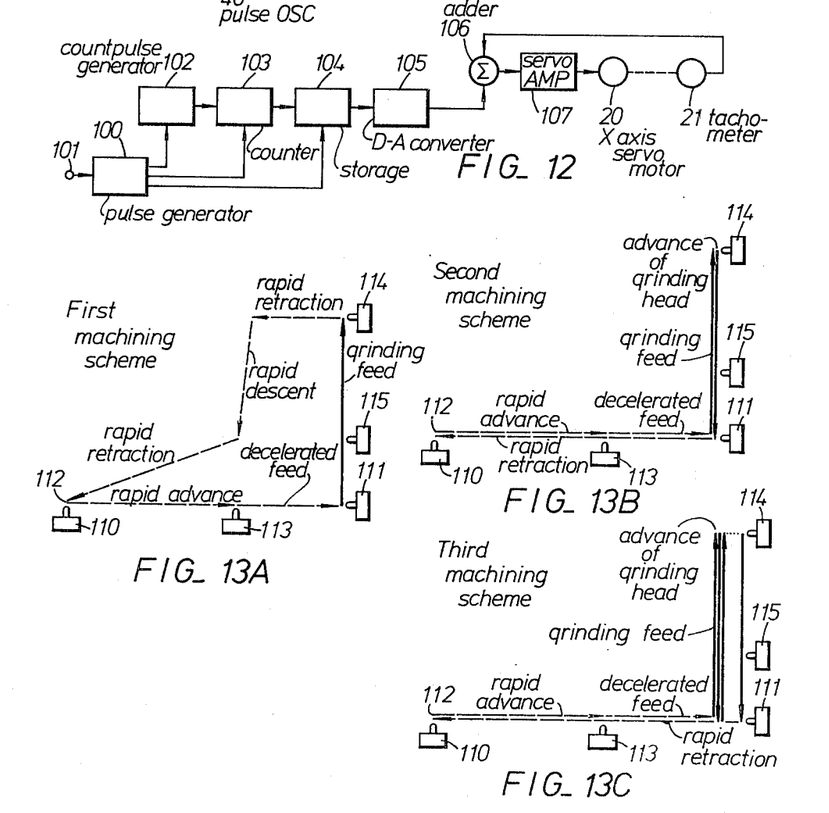

FIG. 12 shows a control circuit for providing a uniform pitch feeding along the Z axis, which includes a pulse generator 100 which receives an instruction pulse from a terminal 101 for each revolution of the model 6. The instruction pulse activates the control pulse generator 100 so as to produce a control pulse. A count pulse generator 102, a counter 103 and a storage 104 operate in response to the control pulse, and the output pulse from the count pulse generator 102 is counted by the counter 103. After the completion of one revolution of the model 6, when the next control pulse is applied to the count pulse generator 102, the delivery of the count pulse is interrupted, whereby the pulse counting operation is terminated. The prevailing count is immediately transferred to the storage 104, which stores this count until a new count is supplied thereto. When the count is stored in the storage 104, the counter 103 is reset and the count pulse generator 102 resumes its operation, supplying the count pulses to be counted by the counter 103. The termination of the counting operation, storage, the resetting of the counter, and resumption of the counting operation take place within a very short time interval, thus delivering the count which is accumulated in the counter 103 for each revolution of the model to the storage 104. The output of the storage 104 is converted into an analog signal by a D-A converter 105 having a reciprocal characteristic, and the signal is passed through an adder 106 and a servo amplifier 107 to the servo motor 20, thus determining the speed of the Z axis servo motor 20. The rotational speed of the motor 20 is detected by the tachometer 215 the output of which is fed back to the adder 106.

Now a grinding operation will be described. A member such as a turbine blade cannot be successfully machined in a single operation because of the increased wall thickness and increased stock removal required and the high level of hardness of the material used, such as stainless steel, and if it is attempted to complete the machining in a single operation, a slippage of or damage to the abrasive belt or seizure or the workpiece will result, disabling the grinding operation. As a consequence, a reciprocatory machining over a plurality of cycles is required. In the present embodiment, a first, a second and a third machining scheme can be selectively employed. Referring to FIGS. 6 and 13, the tracer head mounting assembly and the abrasive belt 3 remain at rest at an origin 112 as a result of the functioning of −X stopping limit switch 110 and −Z stopping limit switch 111. If a selection switch on a control panel is thrown to the first machining scheme and a profiling start button is depressed, the X axis servo motor 23 drives the X axis slide 22 in the +X direction rapidly, and simultaneously the abrasive belt 3 is driven by the motor 207 for running, as illustrated in FIG. 13A. When it reaches a given position in the +X direction, +X deceleration limit switch 113 is depressed, thus causing a deceleration of the movement. At the same time, a cutting oil is supplied to the end of the abrasive belt 3. Then, the stylus 7 of the skew angle detector 25 mounted on the free end of the tracer head 26 moves into contact with the model 6, and simultaneously the end of the abrasive belt 3 also moves into contact with the workpiece 2. The profiling is continued as the stylus 7 moves upward from the root portion of the model while maintaining a constant displacement with respect to the model 6, and the abrasive belt 3 follows the movement of the stylus 7. When the stylus 7 moves upward to a given position in this manner, +Z stopping limit switch 114 is actuated, whereby a rapid retraction in the X-direction is initiated, terminating the profiling grinding operation. When it has retracted to a location where it actuates +X deceleration limit switch 113, a rapid descent in the −Z direction is initiated. When a −Z deceleration limit switch 115 is actuated, the rapid descent in the −Z direction is decelerated, and subsequently it returns to the origin where it comes to a stop. Thereupon, the entire system has resumed the initial condition before commencing the grinding operation.

If the selection switch on the control panel is thrown to the second machining scheme (FIG. 13B) and the profiling start button is depressed, the X axis slide 22 moves in the similar manner as mentioned above in connection with the first machining scheme until it bears against +Z stopping limit switch 114, whereupon it descends while performing a profiling operation. After −Z stopping limit switch 111 is actuated, the profiling operation is interrupted, and a rapid retraction in the −X direction is initiated and continued until it comes to a rest at the origin 112. Now the entire system has resumed the initial condition before commencing the grinding operation. If the selection switch on the control panel is thrown to the third machining scheme and the profiling start button is depressed, the X axis slide 22 commences its operation in the similar manner as in the second machining scheme, generally as illustrated in FIG. 13C. However, the profiling operation is continued even after −Z stopping limit switch 111 is actuated, so that the stylus 7 copies the model 6 and the abrasive belt 3 moves upward while grinding the workpiece 2. When +Z stopping limit switch 114 is actuated, it descends again, and the described operation can be repeated a number of times as desired. The profiling operation is immediately interrupted when a profiling stop button on the control panel is depressed, whereupon the X axis slide 22 is rapidly retracted until it reaches the origin 112 where it comes to a stop. The entire system resumes to the initial condition before commencing the grinding operation. The amount of in-feed can be adjusted in any operational mode by applying a very small feed to the tracer head 26 by means of the electric motor 23. The X axis slide 22 can be manually fed from the origin 112 to the machining position. Since the amount of feed in the Z axis direction during one revolution of the workpiece 2 is less than the width of the abrasive belt 3, the workpiece will be subjected, except the upper and lower end portions, to a plurality of grinding operations during one stroke in the Z axis direction, and consequently the stock removal will be reduced in the upper and lower end portions. To overcome this difficulty, a timer control is utilized to stop the movement in the Z axis direction at the upper and lower extremities, so that these portions can be ground over a plurality of revolutions.

It is necessary that the radius of the contact segment 7a of the stylus 7 as well as that of the grinding portion of the abrasive belt 3 or the contact wheel 4 be maintained less than the minimum radius of curvature encountered in the concave portion of the model. On the other hand, a reduction in the radius of the contact wheel 4 will result in a reduced grinding efficiency and an accelerated wear of the abrasive belt 3. In view of these considerations, it is desirable that the stylus 7 and the contact wheel 4 be changed to ones having a suitable radius each time the size or configuration of the model 6 is changed. Such change results in a variation in the radius r of the stylus which appears in the equations (24) and (25), and accordingly the value of r is adjusted by means of the variable resistor 54 shown in FIG. 7 by turning a corresponding knob on the control panel. Such adjustment can be automatically achieved. By way of example, FIG. 10 shows that a mounting plate 116 is rotatably mounted on the forward end of the arm 75 by means of bearing 76, and the contact segment 7a of the stylus is detachably mounted on the mounting plate 116. A plurality of microswitches 117 are located on the surface of the mounting plate 116 which faces the stylus so as to be selectively actuated by a projection 118 extending therefrom, thus automatically detecting the radius r of the contact segment 7a as the stylus is changed.

It has been described above that the speed $V_x$ in the X axis direction and the angular velocity $\omega$ about the A shaft in the described two dimensional profiling control are given by the equations (24) and (25). When grinding a member such as a turbine blade, a certain surface portion of the model may be located very close to the center of rotation thereof, which means that the term $(R - r\cos \theta)$ assumes a very small value. Also, the center of rotation may be located outside the surface of the model, and in this case the term $(R - r\cos \theta)$ may assume a negative value. In this instance, a point is temporarily experienced where $R - r\cos \theta = 0$, which prevents a normal profiling operation.

To enable a normal profiling operation under these conditions, it is necessary to know the limit values $$\lim_{R - r\cos \theta \to 0} V_x \quad \text{and} \quad \lim_{R - r\cos \theta \to 0} \omega$$

$$V_x = \frac{R}{R - k_1 r \cos \theta} \left\{ \left( V_0 + k_2 r \frac{d\theta}{dt} \right) \sin \theta \right.$$

or the negative value of the denominator. Obviously, this requires that every factor including $d\Theta/dt$ be detected with a sufficient accuracy, which cannot be easily achieved by using analogus logic circuits. In order to enable the profiling operation under such special conditions, the following equations can be adopted in accordance with the invention:

$$\left. - K(\epsilon - \epsilon_0)\left(\cos \theta - \frac{k_1 r}{R}\right) \right\} \tag{26}$$

$$\omega = \frac{\left(V_0 + k_2 r \frac{d\theta}{dt}\right)}{R - k_1 r \cos \theta} \left\{ \cos \theta - K(\epsilon - \epsilon_0) \sin \theta \right\} \tag{27}$$

for $0 \leq k_1 \leq 1$, $0 \leq k_2 \leq$, $k_1 \leq k_2$

Thus, r is multiplied by an adjusting factor $k_1$ or $k_2$, each of which is less than unity. These factors $k_1$ and $k_2$ are established by the circuits 216 and 215 shown in FIG. 7. The circuits 216, 215 may be either a variable attenuator or a variable gain amplifier. The control according to the equations (26) and (27) assures a stable operation under the conditions where the equality $k_1 = k_2 = 1$ does not apply, in which the point of contact moves with a speed which is not completely constant but which can be made very close to a constant value by a suitable adjustment of the factors $k_1$, $k_2$.

Figure 14:
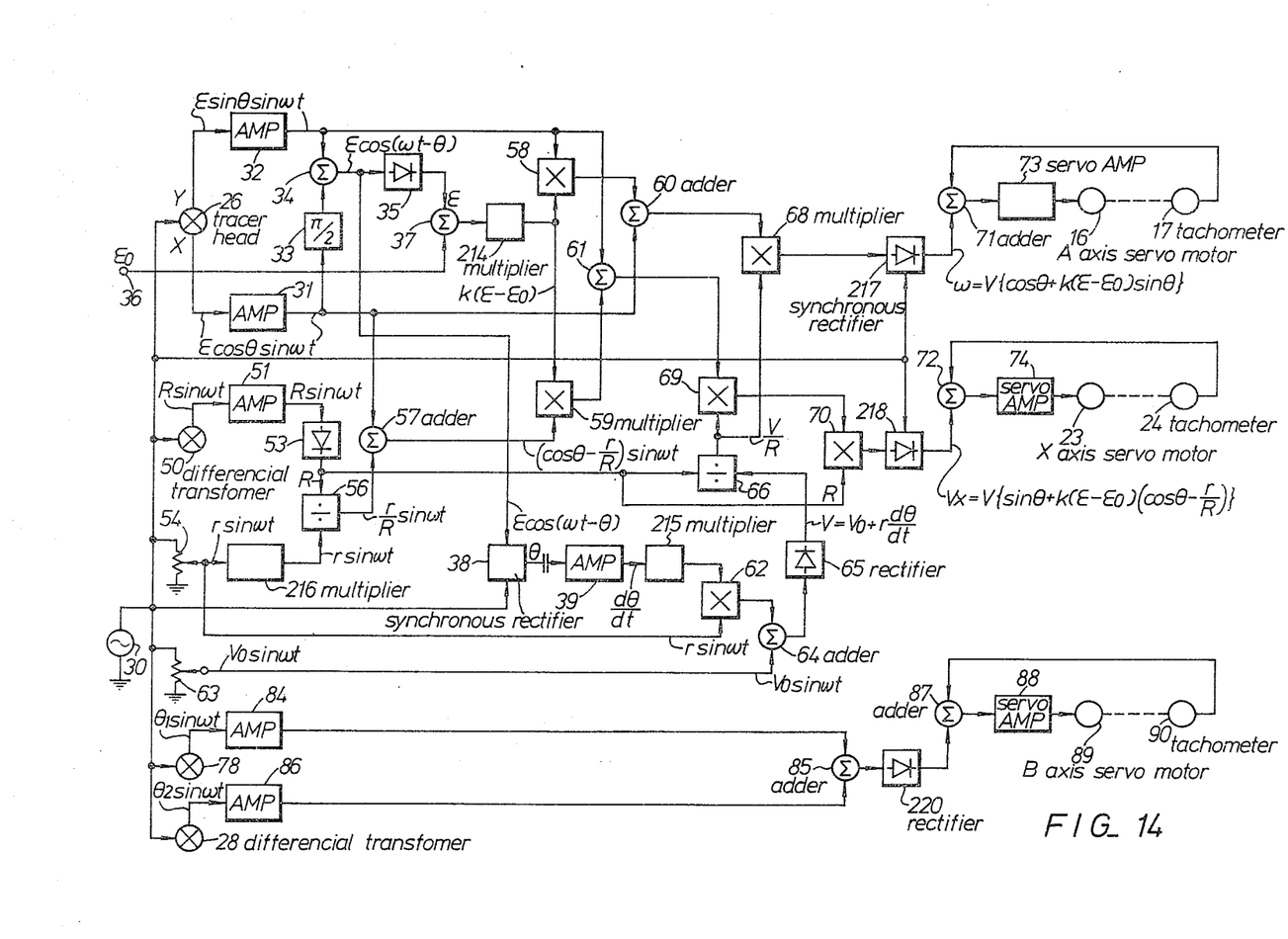
FIG. 14 is a block diagram of a simplified arrangement for obtaining various control signals in the automatic profiling control system of the invention.

The circuit arrangement can be substantially simplified by choosing $k_1 = 0$. FIG. 14 shows a block diagram of such arrangement, and in this Figure, corresponding parts are designated by like numerals, without repeating its description.

Figures 15, 16:
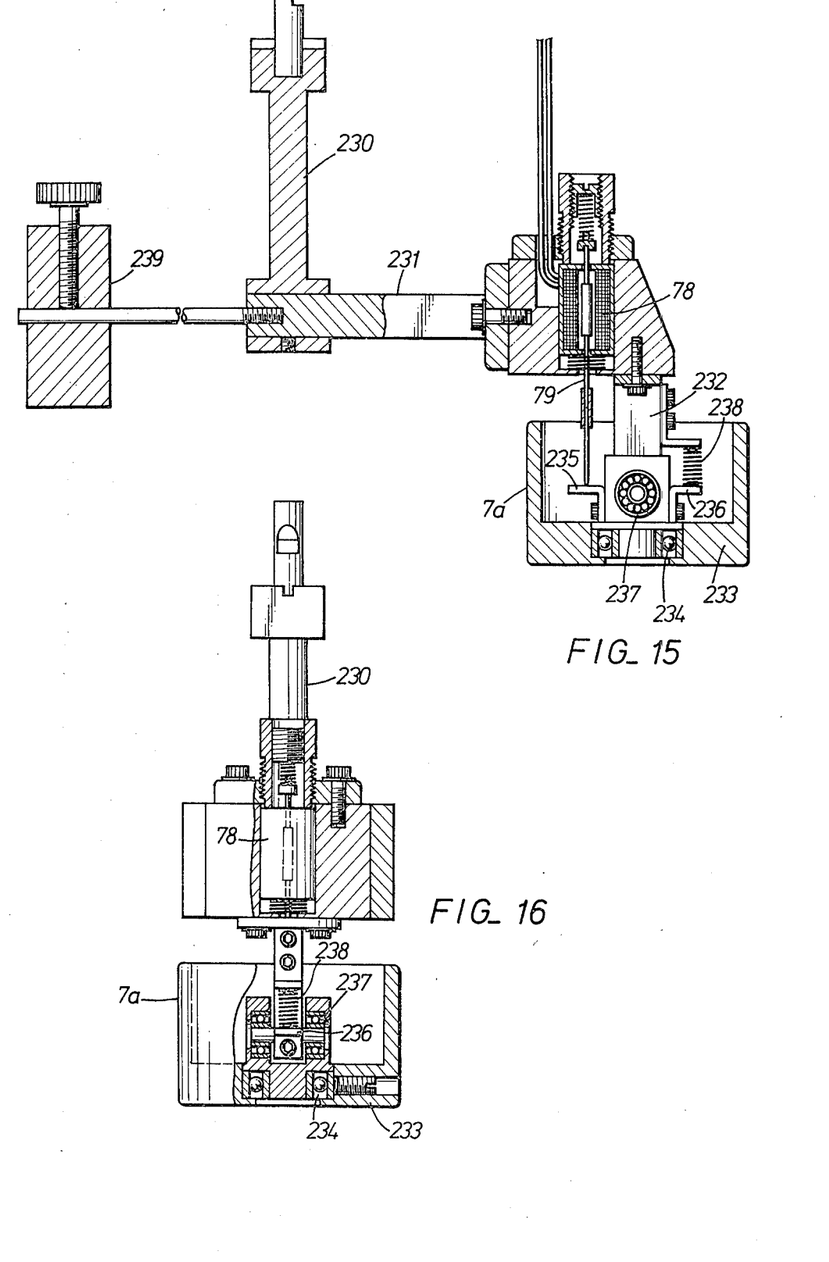
FIG. 15 is a longitudinal section of another example of the contact segment of the stylus.
FIG. 16 is a combined section and side elevation, the right-hand half being shown in side elevation.

The model 6 rotates while being maintained in contact with the stylus 7, and it will be appreciated that the frictional engagement between the model 6 and the stylus 7 should be minimized in order for the displacement of the stylus 7 to be detected accurately. In this respect, the contact segment 7a of the stylus may be in rolling contact with the model 6. By way of example, FIGS. 15 and 16 show that an arm 230 which is attached to the stylus mounting assembly of the tracer head is connected at its lower end with another arm 231 which extends in a direction parallel to the X axis, and the free end of which carries a shaft 232 which extends in a direction parallel to the Z axis. A cylindrical contact piece 7a of the stylus having a closed bottom face is disposed on the shaft 232 with its axis in alignment therewith, and a bottom plate 233 centrally carries a bearing 234 which permits a rotation of the contact segment 7a around the Z axis. A pair of connecting pieces 235, 236 attached to the bearing 234 are mounted on the shaft 232 through a bearing 237 so as to be rotatable about the Y axis. The free end of the core 79 of the differential transformer 78 which is contained in the end of the arm 231 bears against a portion of the connecting piece 235, while a return spring 238 is interposed between a portion of the connecting piece 236 and the shaft 232. This permits the contact segment 7a to contact the model 6 while rotating about the shaft 232 as the model 6 rotates, thus producing an accurate displacement of the stylus. A balancing weight 239 may be attached to the opposite end of the arm 231.

While in the above description, the stylus and the tool have been moved in the direction of the X axis, the model and the workpiece may be moved in the direction of the X axis. This is easily achieved by inverting the polarity of the sign of the X axis signals in the above mentioned control. An automatic profiling control has been described above primarily in connection with the grinding of a turbine blade by an abrasive belt, but it should be understood that the workpiece and the tool are not limited to these examples, and that the invention is also applicable to the machining of other members such as a propeller, screw or the like which have a complex curved surface, and is also applicable to other members having a simple surface configuration. The invention is also equally applicable to the profiling by a conventional milling machine or to any other machining operations.

From the foregoing, it will be appreciated that with the automatic profiling control system according to the invention, the point of contact between the stylus and the model moves along the peripheral surface of the model with a uniform velocity, enabling a high accuracy machining and also achieving an accurate and high speed machining where the tool has a substantial width, while retaining the advantage of a relatively simple arrangement.

We claim:

1. An automatic profiling machine comprising means for rotating a model, means for rotating a workpiece in synchronism with the rotation of the model, a stylus capable of relative movement with respect to the model in a direction perpendicular to the axis of rotation of the model and adapted for contact therewith, means for detecting a displacement of the stylus from its neutral point as it contacts the model, means for detecting a distance between the center of the stylus and the center of rotation of the model, means for controlling the rotational speed of the model and the speed of relative movement between the model and the stylus in accordance with the detected values of said displacement and distance so that the point of contact between the stylus and the model moves along the contour of the model with a given speed, a tool for machining the workpiece, the tool being disposed n the same positional relationship as that between the model and the stylus, means for causing a relative movement between the tool and the workpiece in a manner similar to the relative movement between the stylus and the model, means for rotatably holding a contact segment of the stylus against the model so that the segment is in exact conformity to the surface thereof, means for detecting a rotation of the contact segment, and means for causing a skew of the tool in accordance with the detection of the rotation.

2. An automatic profiling machine according to claim 1 in which the tool is an abrasive belt.

3. An automatic profiling machine according to claim 1 in which the speed control means comprises means for deriving from a pair of components $\epsilon \cos \theta$ and $\epsilon \sin \theta$ of the displacement of the stylus in a pair of orthogonal directions in a plane which is perpendicular to the axis of rotation of the model and from a distance R between the center of rotation of the model and the center of the stylus a rotational speed control signal $$\omega = \frac{V}{R - r \cos \theta} (\cos\theta - K(\epsilon - \epsilon_o) \sin \theta),$$

and means for deriving a control signal for the speed of relative movement $$V_r = \frac{V}{R - r \cos \theta} R \left\{ \sin \theta + K(\epsilon - \epsilon_o)\left(\cos\theta - \frac{r}{R}\right)\right\}$$

wherein $V = V_0 + r(d\theta/dt)$, $V_0$ is a given speed along the contour of the model, $r$ the radius of the stylus, $\epsilon_0$ a reference displacement of the stylus and $K$ a constant.

4. An automatic profiling machine according to claim 3, further including adjusting means for modifying the value of $r$ except for that appearing in the term $r(d\theta/dt)$ to a smaller value than its actual value, and means for multiplying the term $(d\theta/dt)$ by a factor which is less than unity.

5. An automatic profiling machine according to claim 1 in which the speed control means comprises for deriving from a pair of components $\epsilon \cos \theta$ and $\epsilon \sin \theta$ of a displacement of the stylus in a pair of orthogonal directions in a plane which is perpendicular to the axis of rotation of the model and from a distance $r$ between the center of rotation of the model and the center of the stylus, a rotational speed control signal $$\omega = \frac{V}{R} \left( \cos \theta - K(\epsilon - \epsilon_o) \sin \theta \right)$$

and means for deriving a control signal for the speed of the relative movement $$V_r = V \left\{ \sin \theta + K(\epsilon - \epsilon_o) \cos \theta \right\}$$

wherein $V = V_0 + k_2 r(d\theta/dt)$, $V_0$ is a given value along the contour of the model, $r$ the radius of the stylus, $\epsilon_o$ a reference displacement of the stylus, and $K$ and $k_2$ constants.

6. An automatic profiling machine according to claim 1, further including means for moving the model and the stylus according to each other in a direction along the axis of rotation of the model, means for moving the workpiece and the tool relative to each other in a direction along the axis of rotation of the workpiece in a similar manner as the axial relative movement between the model and the stylus, and means for controlling both speeds of axial relative movement in inverse proportion to a period of rotation of the model.

7. An automatic profiling apparatus comprising:
means for rotating a model;
means for rotating a workpiece in synchronism with the rotation of the model;
a stylus capable of relative movement with respect to the model in a direction perpendicular to the axis of rotation of the model and adapted for contact therewith;
means for detecting, as an electrical signal, a displacement, $\epsilon - \epsilon_0$, of the stylus from its neutral point in a plane perpendicular to the axis of rotation of the model as the stylus contacts the model;
means for detecting a distance, R, between the center of the stylus and the center of rotation of the model, in the form of an electrical signal;
means for calculating a changing ratio in time, $d\theta/dt$, of an angle $\theta$ between a line joining the center of the stylus with the center of rotation of the model and a normal to the point of contact of the stylus with the model, based on the electrical signal of the displacement $\epsilon - \epsilon_0$ obtained by the displacement detecting means;

means for deriving a signal for controlling the rotational speed of the model, from the electrical signals respectively indicative of $\epsilon-\epsilon_0$, R and $d\theta/dt$;

means for deriving a signal for controlling the relative movement between the model and the stylus, from the electrical signals respectively indicative of $\epsilon-\epsilon_0$, R and $d\theta/dt$;

means for detecting the rotational speed of the model;

means for detecting the speed of the relative movement between the model and the stylus;

a servo loop for controlling the model rotating means by the rotational speed detecting signal and the rotational speed control signal so that the former signal may be coincident with the latter;

a servo loop for controlling the speed of the relative movement between the stylus and the model by the relative movement speed detecting signal and the relative movement speed control signal so that the former signal may be coincident with the latter, the speed at which the point of contact between the stylus and the model moves along the contour of the model being maintained at a constant value by the control of the both servo loops;

a tool disposed in a positional relationship to the workpiece on a manner similar to the positional relationship between the stylus and the model for machining the workpiece; and means for causing a relative movement between the tool and the workpiece in a manner similar to the relative movement between the stylus and the model.

8. The automatic profiling apparatus of claim 7 further including means for holding a contact segment of the stylus against the model to be rotatable about an axis perpendicular to the axis of rotation of the model so that the contact segment is in exact conformity to the surface of the model, means for detecting the state of rotation of the contact segment, and means for causing a skew of the tool relative to the axis of rotation of the workpiece in accordance with the detection of the state of rotation of the segment.

9. The automatic profiling apparatus of claim 8 wherein the tool is an abrasive belt.

10. The automatic profiling apparatus of claim 7 wherein the rotational speed control signal deriving means is a means for obtaining.

$$\omega = \frac{V}{R - r\cos\theta} (\cos\theta - K(\epsilon - \epsilon_0)\sin\theta),$$

from two components $\epsilon\cos\theta$ and $\epsilon\sin\theta$ of the displacement of the stylus in a direction of the relative movement between the stylus and the model in a plane perpendicular to the axis of rotation of the model and in a direction perpendicular to the direction of the relative movement, the electrical signal of the distance R and the electrical signal of the changing ratio $d\theta/dt$, and relative movement speed control signal deriving means is a means for obtaining $$V_r = \frac{V}{R - r\cos\theta} R \left\{ \sin\theta + K(\epsilon - \epsilon_0)\left(\cos\theta - \frac{r}{R}\right)\right\}$$

from the components $\epsilon\cos\theta$ and $\epsilon\sin\theta$, the signal of the distance R and the signal of the changing ratio $d\theta/dt$, $V = V_0 + r(d\theta/dt)$, $V_0$ being a given speed along the contour of the model, $r$ the radius of the stylus, $\epsilon_0$ a reference displacement of the stylus, and $K$ a constant.

11. The automatic profiling apparatus of claim 10, further including adjusting means for modifying the value of $r$ except for that appearing in the term $r(d\theta/dt)$ to a smaller value than its actual value, and means for multiplying the term $d\theta/dt$ by a factor which is less than unity.

12. The automatic profiling apparatus of claim 7 wherein the rotational speed control signal deriving means is a means for obtaining $$\omega = \frac{V}{R}\left\{\cos\theta - K(\epsilon - \epsilon_0)\sin\theta\right\}$$

from two components $\epsilon\cos\theta$ and $\epsilon\sin\theta$ of the displacement of the stylus in a direction of the relative movement between the stylus and the model in a plane perpendicular to the axis of rotation of the model and in a direction perpendicular to the direction of the relative movement, the electrical signal of the distance R and the electrical signal of the changing ratio $d\theta/dt$, and the movement speed control signal derivative means is a means for obtaining $$V_x = V\{\sin\theta + K(\epsilon - \epsilon_0)\cos\theta\}$$

from the components $\epsilon\cos\theta$, $\epsilon\sin\theta$, the signal of the distance R and the signal of the changing ratio $d\theta/dt$, $V = V_0 + K_2 \cdot r(d\theta/dt)$, $V_0$ being a given speed along the contour of the model, $r$ the radius of the stylus, $\epsilon_0$ a reference displacement of the stylus and $K$ and $K_2$ constants.

13. The automatic profiling apparatus of claim 7 further including means for moving the model and the stylus relative to each other in a direction along the axis of rotation of the model, and means for moving the workpiece and the tool relative to each other in a direction along the axis of rotation of the workpiece in a similar manner to the axial relative movement between the model and stylus.

14. The automatic profiling apparatus of claim 13 further including means for controlling both of the speeds of axial relative movement in inverse proportion to a period of rotation of the model.

* * * * *

UNITED STATES PATENT AND TRADEMARK OFFICE
CERTIFICATE OF CORRECTION

PATENT NO. : 4,031,669
DATED : June 28, 1977
INVENTOR(S) : Sakae Koide and Shigeo Aoki It is certified that error appears in the above-identified patent and that said Letters Patent are hereby corrected as shown below:

In the Heading:

Please change the assignee to read: -- Tahara-Shoyei Engineering Co. Ltd., Tokyo, Japan, and Hoshidenki-Seizo Kabushiki Kaisha, Osaka, Japan --

Signed and Sealed this

First Day of November 1977

[SEAL]

Attest:

RUTH C. MASON
Attesting Officer

LUTRELLE F. PARKER
Acting Commissioner of Patents and Trademarks